Patented Feb. 11, 1941

UNITED STATES PATENT OFFICE 2,231,127

STABILIZATION OF PHOTOGRAPHIC EMULSIONS

John David Kendall, Ilford, England, assignor to Ilford Limited, Ilford, Essex, England, a British company No Drawing. Application December 21, 1938, Serial No. 247,109. In Great Britain December 22, 1937

13 Claims. (Cl. 95—7)

This invention relates to the stabilization of light sensitive silver halide emulsions.

British patent specification No. 452,043 (John David Kendall, filed February 16, 1935) describes a method of stabilizing light sensitive silver halide emulsions by treating them with 2-mercapto-4-hydroxy pyrimidine or its alkyl substituted derivatives and tautomeric compounds. The compounds described in that specification may be represented by the general formula:

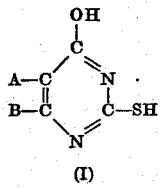

(I)

in which A and B represent hydrogen or the same or different alkyl, aryl or aralkyl groups or together form the remainder of a carbon ring. Such compounds may exist in tautomeric forms, for example:

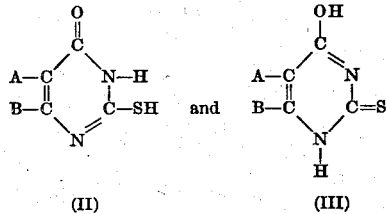

(II)        (III)

It has now been found that the hydrogen atoms attached to the nitrogen atoms in the above tautomeric forms of these compounds may be replaced by alkyl, aryl, aralkyl and other groups and that the compounds so formed are useful stabilizers for photographic emulsions and even in large quantities have little tendency to cause loss in speed.

According to the present invention in photographic material comprising a light sensitive silver halide emulsion and a support (i. e. a glass plate, film, paper or the like) for the emulsion, the emulsion is stabilized against changes during storage by the inclusion of a small quantity of a 2-thio-4-ketotetrahydropyrimidine which is substituted in the 1 or 3 position with a hydrocarbon radical or a substituted hydrocarbon radical and may be substituted in the 5 and/or 6 positions with a hydrocarbon radical or substituted hydrocarbon radical, or a corresponding compound which has a tautomeric form and has an ammonium radical or a metal or a hydrocarbon radical attached to the oxygen or sulphur to form a salt, ether or thioether.

The compounds which are to be used as stabilizers in accordance with the invention conform with one of the following general Formulae IV and V, and preferably compounds conforming with the Formula IV are employed:

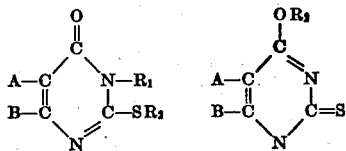

(IV)        (V)

in which $R_1$ represents a hydrocarbon radical or a substituted hydrocarbon radical (e. g. an alkyl, aralkyl or aryl radical, an unsaturated aliphatic radical or a hydroxy phenyl radical).

$R_2$ represents hydrogen or a hydrocarbon radical or an ammonium radical or a metal (e. g. an alkali metal), and A and B, being either similar or different, represent hydrogen or hydrocarbon radicals or substituted hydrocarbon radicals or together represent the remainder of a homocyclic ring with either hydrogen atoms or other monovalent atoms or groups attached to the carbon atoms.

The following are typical examples of the compounds which conform with the general Formulae IV and V and which may be employed in accordance with the present invention. The system of numbering consists in taking the carbon to which the sulphur atom is attached as occupying the 2-position and the carbon to which the oxygen atom is attached as occupying the 4-position so that the nitrogen atom between these two carbon atoms occupies the 3-position, the other nitrogen atom the 1-position and the remaining two carbon atoms the 5- and 6-positions respectively.

(1) 2-thio-3-phenyl-4-ketotetrahydropyrimidine
(2) 2-thio-3 : 6-dimethyl-4-ketotetrahydropyrimidine
(3) 2-thio-3-ethyl-6-methyl-4-ketotetrahydropyrimidine
(4) 2-thio-3-allyl-6-methyl-4-ketotetrahydropyrimidine
(5) 2-thio-3-phenyl-6-methyl-4-ketotetrahydropyrimidine
(6) 2-thio-3-methyl-6-phenyl-4-ketotetrahydropyrimidine
(7) 2-thio-3,5 : 6-trimethyl-4-ketotetrahydropyrimidine
(8) 2-thio-3-ethyl-5 : 6-dimethyl - 4 - ketotetrahydropyrimidine
(9) 2-thio-3 : 6-dimethyl-5-ethyl - 4 - ketotetrahydropyrimidine
(10) 2-thio-3 : 5-di-ethyl-6-methyl-4-ketotetrahydropyrimidine
(11) 2-thio-3-allyl-5-ethyl-6-methyl-4-ketotetrahydropyrimidine
(12) 2-thio-5-benzyl-3 : 6-dimethyl-4-ketotetrahydropyrimidine
(13) 2-thio - 5 - benzyl-6-methyl-3-ethyl-4-ketotetrahydropyrimidine
(14) 2-thio-3-methyl-4-ketotetrahydroquinazoline
(15) 2-thio-3-ethyl-4-ketotetrahydroquinazoline
(16) 2-thio-3-allyl-4-ketotetrahydroquinazoline
(17) 2-thio-3-phenyl-4-ketotetrahydroquinazoline
(18) 2-thio-3(3'-hydroxyphenyl)-4-ketotetrahydroquinazoline
(19) 2-thio-4-keto - 3 - methyltetrahydropyrimidyl 6-acetic ethyl ester
(20) 2-methylthio-4-keto-3 : 6-dimethyl-dihydropyrimidine
(21) 2-thio-1-methyl-4-ketotetrahydroquinazoline
(22) 2-thio-1-ethyl-4-ketotetrahydroquinazoline Of the above compounds those numbered (1) to (20) conform with the general Formula IV and those numbered (21) and (22) conform with the general Formula V. The salts and the thioethers of the compounds numbered (1) to (19) above (i. e. compounds conforming with the general Formula IV when $R_2$ represents an ammonium radical, a metal or a hydrocarbon radical) may be employed, and also the salts and the ethers of the compounds (21) and (22), (i. e. compounds which conform with Formula V when $R_2$ represents an ammonium radical, a metal or a hydrocarbon radical) may be used. Compound (20) is a thioether.

Many methods are available for the preparation of the compounds to be used in accordance with the present invention.

The compounds (1) to (13) and (19) above and compounds of similar types may, for example, be prepared by one of the three following methods:

(a) Heating together on a water bath for one hour in excess caustic soda solution equimolecular proportions of a β-ketonic ester and an N-alkyl, N-aryl or N-aralkyl thiourea. The alcohol formed as a by-product may be allowed to distill off during the reaction. The alkaline liquor remaining is cooled in ice and acidified with dilute hydrochloric acid to precipitate the compound required. As a specific example, 2-thio-3-allyl-6-methyl-4-ketotetrahydropyrimidine may be prepared by this method from allyl thiourea and acetoacetic ester.

(b) Heating equimolecular proportions of a β-ketonic ester and an N-alkyl, N-aryl or N-aralkyl thiourea in alcohol on a water bath for 40–60 minutes under reflux in the presence of 1 to 2 molecular proportions of sodium ethoxide. The sodium salt of the product generally separates. When the reaction is finished the reaction mixture is cooled and water added in just sufficient amount to take the sodium salt into solution. The solution is then acidified with dilute acetic acid, whereupon the required compound separates. As a specific example, 2-thio-3:6-dimethyl-4-ketotetrahydropyrimidine may be prepared by this method from methylthiourea and acetoacetic ester.

(c) Heating together equimolecular proportions of an alkyl, aralkyl, or aryl iso-thiocyanate with ethyl-β-amino crotonate at 130–140° C. for 2–3 hours, extracting the product with dilute aqueous caustic soda, and then acidifying the alkaline extract when the required compound separates. As a specific example, 2-thio-3-phenyl-6-methyl-4-ketotetrahydropyrimidine may be prepared by this method from phenyl-isothiocyanate and ethyl-β-amino crotonate.

The compounds (14) to (18) and similar quinazoline compounds may, for example, be prepared by heating equimolecular proportions of an N-alkyl, N-aralkyl or N-aryl thiourea with the ester of an aromatic-o-amino carboxylic acid in an oil bath at 180–190° C. for 1–2 hours; ammonia is evolved; the solid residue is then extracted with boiling alcohol and the required product crystallized out from the extract. As a specific example, 2-thio-3-methyl-4-ketotetrahydroquinazoline may be prepared by this method from methylthiourea and methyl anthranilate.

In some cases the quinazoline compounds may be prepared by following the above method but using the aromatic amino carboxylic acid instead of the ester. As an example, 2-thio-3-phenyl-4-ketotetrahydroquinazoline may be prepared in this way from phenylthiourea and anthranilic acid.

The compounds (21) and (22) and similar compounds may, for example, be prepared by heating for one hour under reflux equimolecular proportions of an N-alkyl anthranilic methyl ester and potassium thiocyanate with water and 1 to 2 molecular proportions of hydrochloric acid; the required product separates and may be purified by dissolving it in dilute aqueous caustic soda and re-precipitating it by the addition of dilute hydrochloric acid. As a specific example, 1-methyl-2-thio-4-ketotetrahydroquinazoline may be prepared by this method from methyl-N-methyl-anthranilate and potassium thiocyanate.

It is found that emulsions containing stabilizers in accordance with the invention show improved keeping qualities (that is a reduction in the fog produced by incubation or by long storage), whilst changes of contrast and speed to which some emulsions are prone appear in some cases to be eliminated or diminished. Further the action of the stabilizer in many cases is to reduce the fog in freshly prepared emulsions.

The stabilizers may conveniently be added to the photographic emulsion before it is coated on to its support (plate, film or paper) in the proportion of from about 2 to 200 ccs. of a 1/200 aqueous solution of compound per 450 gms. of emulsion, when 450 gms. of emulsion represents approximately 10 gms. of silver nitrate.

The practical application of the method of the invention is illustrated by the following specific examples.

In Examples 1 and 2 the following technique was adopted: Strips of photographic material coated with the emulsion under test without any addition were developed without exposure under standard conditions in the normal developer employed for the particular type of material for various periods of time and at various temperatures. The emulsion was then fixed and washed as usual, and the density of the fog or blackening produced was measured in a standard densitometer relative to a piece of the same material, fixed and washed without development. A similar strip of material was exposed under a standard step wedge to a known light source for a definite time at a fixed distance and then developed under standard conditions in the same developer, fixed and washed, as usual. The amount of blackening of each patch was then measured in a standard densitometer relative to a piece of the same material, fixed and washed without development and the characteristic curve of density against the logarithm of the exposure (a function of the time, the strength of the light source, the distance and the density of the corresponding wedge step, all of which are known) was plotted.

As a measure of the speed of the emulsion, values are given of the "relative exposure," which is the exposure in metre-candle-seconds, required in a given instance to produce a density of 1.0 and which is derived from the anti-logarithm of the logarithm of the exposure at the point on the above characteristic curve where the density is 1.0.

In the case of material on transparent supports, a transmission densitometer of standard type was employed and in the case of material on opaque supports a reflection densitometer of standard type was used.

A similar set of experiments was carried out with strips of the same material coated with the same emulsion to which had been added a portion of the compound under test. Strips of material coated with the untreated emulsion and others with the treated emulsion were then stored in an incubator for ten days at a temperature of 114° F. in a moist atmosphere and a similar series of experiments were repeated using the incubated materials.

The results of the tests are given below.

In every case the quantity of substance added is the quantity added to 150 ccs. of a batch of emulsion in which 200 gms. of silver nitrate gave about 5320 gms. of finished emulsion.

The substance was added in the form of an aqueous or alcoholic solution of suitable strength dependent upon the solubility.

Example 1

A washed fast normal bromide emulsion of the type usually employed for photographic papers but rather prone to fog was treated with a 1/700 alcoholic solution of 3-phenyl-4-keto-2-mercapto-dihydroquinazoline.

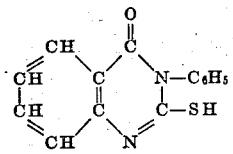

This compound was prepared by heating together phenylthiourea and anthranilic acid.

For comparison purposes strips coated with the treated emulsion and strips coated with the untreated emulsion were developed without exposure in a metolhydroquinone developer, as normally used for photographic paper, for periods of 2, 4, 10 or 20 minutes respectively at 65° F. A second series were developed in the same way after incubation for 10 days at 115° F. and 40% relative humidity.

The fog densities as measured in a standard densitometer are given in the following table:

| Amount added per 150 ccs. emulsion | Incubated | Relative exposure in seconds | Fog density after a development of: | | | |
|---|---|---|---|---|---|---|
| | | | 2 mins. | 4 mins. | 10 mins. | 20 mins. |
| None | No | 5.3 | 0.01 | 0.04 | 0.26 | 0.65 |
| Do | Yes | 10.0 | 0.68 | 1.00 | 1.45 | 1.79 |
| 0.0028 gm | No | 5.8 | 0.01 | 0.01 | 0.20 | 0.60 |
| 0.0028 gm | Yes | 9.7 | 0.07 | 0.29 | 0.57 | 1.14 |
| 0.028 gm | No | 8.1 | 0.00 | 0.005 | 0.22 | 0.57 |
| 0.028 gm | Yes | 13.2 | 0.01 | 0.02 | 0.09 | 0.38 |

Example 2

A similar emulsion to that used in Example 1 was treated with a 1/500 aqueous solution of 3:6-dimethyl-2-mercapto-4-ketodihydropyrimidine

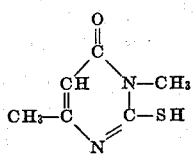

This compound was obtained as its sodium salt by heating methylthiourea and ethylacetoacetate in the presence of sodium ethylate.

Comparisons similar to those described in Example 1 were carried out and the results are given in the following table:

| Amount added per 150 ccs. emulsion | Incubated | Relative exposure in seconds | Fog density after a development of: | | | |
|---|---|---|---|---|---|---|
| | | | 2 mins. | 4 mins. | 10 mins. | 20 mins. |
| None | No | 5.3 | 0.01 | 0.04 | 0.26 | 0.65 |
| Do | Yes | 10.0 | 0.68 | 1.00 | 1.45 | 1.79 |
| 0.0028 gm | No | 5.0 | 0.00 | 0.02 | 0.21 | 0.60 |
| 0.0028 gm | Yes | 9.6 | 0.15 | 0.30 | 0.76 | 1.46 |
| 0.028 gm | No | 5.8 | 0.005 | 0.02 | 0.20 | 0.47 |
| 0.028 gm | Yes | 6.7 | 0.07 | 0.22 | 0.32 | 0.70 |

Example 3

This example illustrates the application of the invention to a high speed panchromatic emulsion.

The stabilizing compound 2-thio-3:6-dimethyl-4-ketotetrahydropyrimidine dissolved in alcohol was added to the melted emulsion in the amount stated in the following table, the emulsion containing 330 gms. of silver halide per 4,500 ccs. The emulsion was coated on a film support and after exposure behind a sector wheel and development in a normal developer the resulting fog values were determined. Portions of the unexposed film were then heated for 7 days at 125° F. and 47% relative humidity. Standard development was then effected and fog values determined.

Results

| Amount of stabiliser added | Initial fog | Fog after incubation |
|---|---|---|
| None | 0.06 | 0.63 |
| 0.1 gm. per 4,500 ccs | 0.06 | 0.15 |

Similar reduction in the fog values are obtained using equal amounts of:

1-ethyl-2-thio-4-ketotetrahydroquinazoline
2-thio-5 : 6-dimethyl-3-ethyl-4-ketotetrahydropyrimidine
2-thio-5-benzyl-6-methyl-3-ethyl-4-ketotetrahydropyrimidine
2-thio-3 : 6-dimethyl-5-ethyl-4-ketotetrahydropyrimidine
2-thio-3 : 5-diethyl-6-methyl-4-ketotetrahydropyrimidine The compound 2-thio-3-phenyl-6-methyl-4-keto-tetrahydropyrimidine gives even better reduction in fog value both in respect of initial fog and fog after incubation compared with 2-thio-3:6-dimethyl-4-keto - tetrahydropyrimidine the figures for which are given above.

None of the above compounds effects more than a very slight reduction in the speed of the emulsion when added in the amount specified.

Example 4

This example illustrates the application of the invention to a fast negative emulsion which is not colour-sensitized.

The stabilizing compound 2-thio-3-phenyl-4-ketotetrahydropyrimidine dissolved in alcohol was added to a fast non-colour-sensitized negative emulsion containing 330 gms. of silver bromide per 4,500 ccs. The testing procedure was the same as in Example 3.

Results

| Amount of stabilizer added | Initial fog | Fog after incubation |
|---|---|---|
| None | 0.05 | 0.27 |
| 0.1 gm. per 4,500 ccs | 0.06 | 0.08 |

Only a slight reduction in the speed of the emulsion was caused by the addition of the stabilizer.

Although it is preferred to incorporate the stabilizing compound in the light sensitive emulsion, it may be incorporated, alternatively or in addition, in the support, in a separate layer coated on top of the emulsion or in an intermediate layer between the emulsion and support, for example the baryta coating commonly used in photographic papers, or the finished photographic material may be bathed in a solution of the stabilizing compound. Also the stabilizing compound may be incorporated in the wrapping materials or other materials used in juxtaposition to the emulsion. The present invention includes such modifications.

I claim:

1. A photographic element comprising a light sensitive silver halide emulsion having in fog inhibiting relationship therewith a compound corresponding to one of the following formulae:

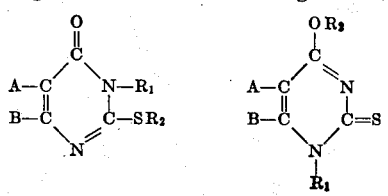

wherein $R_1$ is a hydrocarbon radical, $R_2$ is a member of the group consisting of hydrogen, hydrocarbon radicals, ammonium and alkali metal, and A and B are members selected from the group consisting of a hydrogen atom, a monovalent hydrocarbon radical, and a radical in which A and B together form a 6-membered carbocyclic ring with the two specified carbon atoms of the pyrimidine ring.

2. A photographic element comprising a light sensitive silver halide emulsion having in intimate contact therewith in fog inhibiting amounts a compound corresponding to one of the following formulae:

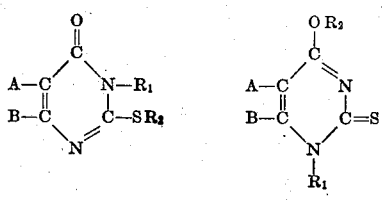

wherein $R_1$ is a hydrocarbon radical, $R_2$ is a member of the group consisting of hydrogen, hydrocarbon radicals, ammonium and alkali metal, and A and B are members selected from the group consisting of a hydrogen atom, a monovalent hydrocarbon radical, and a radical in which A and B together form a 6-membered carbocyclic ring with the two specified carbon atoms of the pyrimidine ring.

3. A photographic element comprising a light sensitive silver halide emulsion containing a compound corresponding to one of the following formulae:

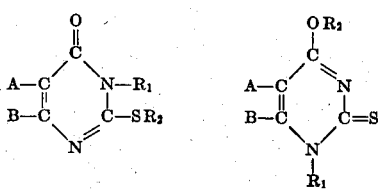

wherein $R_1$ is a hydrocarbon radical, $R_2$ is a member of the group consisting of hydrogen, hydrocarbon radicals, ammonium and alkali metal, and A and B are members selected from the group consisting of a hydrogen atom, a monovalent hydrocarbon radical, and a radical in which A and B together form a 6-membered carbocyclic ring with the two specified carbon atoms of the pyrimidine ring.

4. A photographic element comprising a light sensitive silver halide emulsion containing in fog inhibiting amounts a compound corresponding to one of the following formulae:

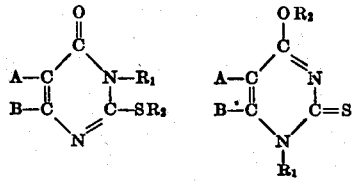

wherein $R_1$ is a hydrocarbon radical, $R_2$ is a member of the group consisting of hydrogen, hydrocarbon radicals, ammonium and alkali metal, and A and B are members selected from the group consisting of a hydrogen atom, a monovalent hydrocarbon radical, and a radical in which A and B together form a 6-membered carbocyclic ring with the two specified carbon atoms of the pyrimidine ring.

5. A photographic element comprising a light sensitive emulsion having in intimate contact therewith in fog inhibiting amounts a 2-thio-4-keto-tetrahydropyrimidine which contains a hydrocarbon radical in the 3-position.

6. A photographic element comprising a light sensitive emulsion having in intimate contact therewith in fog inhibiting amounts a salt taken from the group consisting of alkali metal and ammonium salts of a 2-thio-4-keto-tetrahydropyrimidine which contains a hydrocarbon radical in the 3-position.

7. A photographic element comprising a light sensitive emulsion having in intimate contact therewith in fog inhibiting amounts an alkali metal salt of a 2-thio-4-keto-tetrahydropyrimidine which contains a hydrocarbon radical in the 3-position.

8. A photographic element comprising a light sensitive emulsion having in intimate contact therewith in fog inhibiting amounts of a salt taken from the group consisting of alkali metal and ammonium salts of a 2-thio-4-keto-tetrahydroquinazoline which is substituted in the 3-position with a hydrocarbon radical.

9. A photographic element comprising a light sensitive emulsion having in intimate contact therewith in fog inhibiting amounts of an alkali metal salt of a 2-thio-4-keto-tetrahydroquinazoline which is substituted in the 3-position with a hydrocarbon radical.

10. A photographic element comprising a light sensitive emulsion having in intimate contact therewith in fog inhibiting amounts a 2-thio-4-keto-tetrahydropyrimidine which contains a hydrocarbon radical in the 3-position, and alkyl groups in the 5 and 6 positions.

11. A photographic element comprising a light sensitive silver halide emulsion containing in fog inhibiting amounts a 3-phenyl-4-keto-2-mercapto dihydroquinazoline.

12. A photographic element comprising a light sensitive silver halide emulsion containing in fog inhibiting amounts a 2-thio-5:6-dimethyl-3-ethyl-4-keto-tetrahydropyrimidine.

13. A photographic element comprising a light sensitive silver halide emulsion containing in fog inhibiting amounts a 3:6-dimethyl-2-mercapto-4-ketodihydro pyrimidine.

JOHN DAVID KENDALL.